United States Patent [19]

Beauch

[11] Patent Number: 4,470,322
[45] Date of Patent: Sep. 11, 1984

[54] STEERING COLUMN WITH ADJUSTABLE TILT HEAD AND STEERING WHEEL ASSEMBLY

[75] Inventor: Howard D. Beauch, Hemlock, Mich.

[73] Assignee: General Motors Corporation, Detroit, Mich.

[21] Appl. No.: 302,968

[22] Filed: Sep. 17, 1981

[51] Int. Cl.³ .......................... B62D 1/18; G05G 5/06
[52] U.S. Cl. ........................................ 74/493; 74/535
[58] Field of Search .................. 74/493, 535; 280/775

[56] References Cited

U.S. PATENT DOCUMENTS

| | | | |
|---|---|---|---|
| 3,355,962 | 12/1967 | Gerdes et al. | 74/493 |
| 3,796,112 | 3/1974 | Hoffman | 74/493 |
| 4,029,168 | 6/1977 | Kramer | 74/493 |
| 4,078,448 | 3/1978 | Naka | 74/535 |
| 4,102,218 | 7/1978 | Naka et al. | 74/493 |

FOREIGN PATENT DOCUMENTS

| | | | |
|---|---|---|---|
| 231839 | 2/1964 | Fed. Rep. of Germany | 74/535 |
| 0053962 | 5/1981 | Japan | 74/493 |

Primary Examiner—Lawrence J. Staab
Assistant Examiner—Michael J. Gonet
Attorney, Agent, or Firm—Charles R. White

[57] ABSTRACT

Steering column with tilt head having tilt locking and release dog controlled by manual lever operable in camming slot therein and normally biased by spring to an over-tilt center position for positive locking of the tilt head in selected tilt position.

2 Claims, 4 Drawing Figures

STEERING COLUMN WITH ADJUSTABLE TILT HEAD AND STEERING WHEEL ASSEMBLY

This invention relates to steering columns and more particularly to a vehicle steering column with an angularly adjustable tilt head and steering wheel assembly featuring a new and improved adjustment and positive locking mechanism for the tilt head and wheel assembly.

Prior to the present invention, a variety of steering columns have been provided with tilt heads and steering wheel assemblies to permit appropriate adjustment by the vehicle operator to various positions to suit the operator's requirements. While such columns have provided important benefits for the comfort of the operator and for improved vehicle operation, the adjustment mechanisms are often complex in construction and require a large space within a crowded area within the column and generally provide only a limited range in which there are only a few adjustment positions.

In this invention a steering column is provided with a new and improved tilt head and steering wheel assembly which features a single cam actuated locking and unlocking dog that provides for simplified positive locking to maintain tilt position under high load condition and yet can be readily released by the operator for adjustment by simple motion of a tilt control lever. This invention provides for the retention of the tilt head in a wider range of tilt positions as compared to prior art constructions. These tilt positions are positively maintained with multiple tooth meshing of locking parts with resulting minimized lash. With this invention the number of parts are minimized to provide a more compact, lighter weight and economical tilt control construction. In one preferred embodiment of this invention, a single spring device is used to maintain a tilt control lever in operative engagement with a tilt release and locking dog, and the tilt release and locking dog in locking engagement with a multi-toothed lock rack.

These and other features, objects, and advantages of this invention will be more apparent from the following detailed description and drawing in which.

Figure 1:
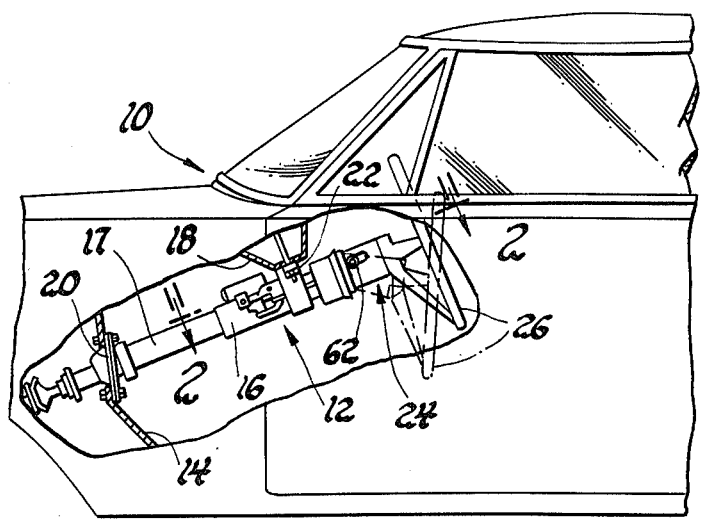
FIG. 1 is a side view of a portion of a vehicle body broken away to illustrate a tiltable steering column in accordance with this invention.

With particular reference to FIG. 1 of the drawing, there is shown a vehicle body 10 which has within its passenger compartment a steering column assembly 12 that projects through a forward bulkhead 14. More particularly, the steering column 12 includes upper and lower tubular jackets 16 and 17 with the lower jacket 17 secured to the bulkhead 14 by a bracket 20. The upper jacket 16 is mounted to instrument panel construction 18 by bracket 22. The steering column incorporates a tiltable head 24 having a manually operated steering wheel 26 operatively mounted thereon. The head 24 and connected steering wheel 26 provides a tilt head assembly which is adjustable as a unit through a wide angular range and a plurality of predetermined angular positions with respect to tilt axis A illustrated in FIG. 3 to facilitate vehicle entry and exit by the vehicle driver and to maximize driver comfort.

The steering wheel 26 is operatively connected to an upper steering shaft 28 and retainer nut 29 so that the driver can turn the steering shaft through the steering wheel for vehicle steering purposes. This upper shaft is pivotally connected by a universal joint 30 to a lower steering shaft 32 which extends axially within the mast jackets into operative connection with vehicle steering gear in the engine compartment of the vehicle 10.

Figure 3:
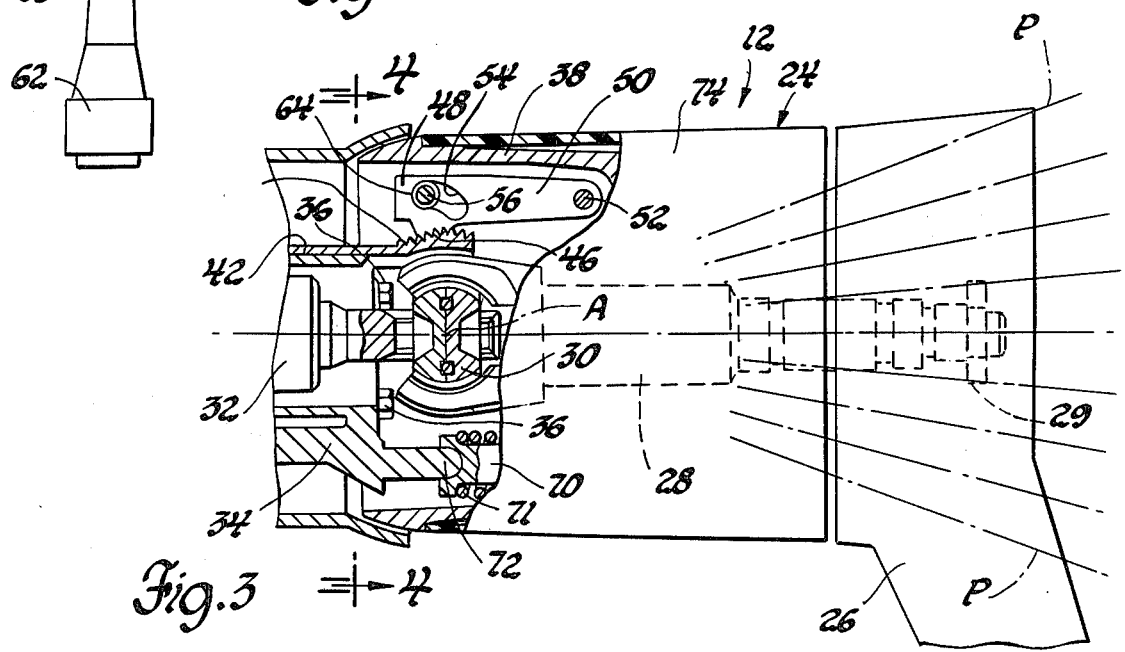
FIG. 3 is a side view partially in section taken generally along lines 3—3 of FIG. 2.

The tilt head assembly of the steering column has an internal support cylinder 34 disposed around a portion of the lower steering shaft 32 and is rigidly secured to an end portion of the upper mast jacket 16 by threaded fasteners 36 and a suitable retainer, not illustrated, also secured to the upper end of the jacket 16. In addition to support cylinder 34, the tilt head assembly incorporates a large diameter tilt cylinder 38 supporting the upper steering shaft 28 for rotation therein by internal bearings not illustrated. The tilt cylinder 38 is pivotally mounted to the support cylinder for limited tilting movement in a vertical plane, as indicated by FIGS. 1 and 3 of the drawing by trunnion-like pivots 40, 40 laterally aligned with the universal joint 30.

Figure 2:
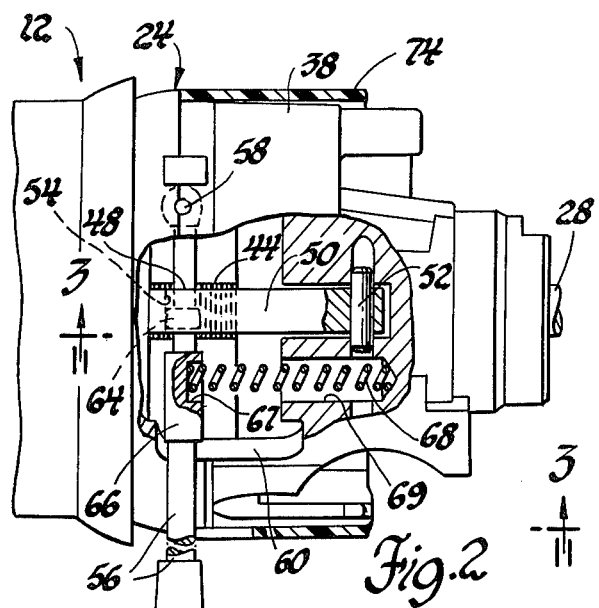
FIG. 2 is a top plan view taken along lines 2—2 of FIG. 1.
Figure 4:
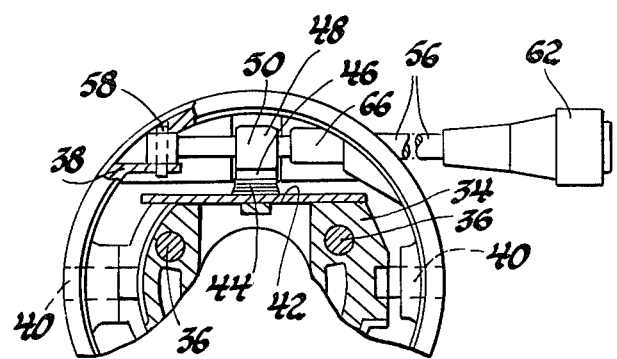
FIG. 4 is an end view, partly in section with certain parts removed, taken generally along lines 4—4 of FIG. 3.

The support cylinder 34 has a flattened upper surface 42 on which a multi-toothed tilt locking and release rack 44 is integrally formed or is otherwise secured. This rack is a sector gear member whose teeth have multiple engagement with meshing teeth 46 in the head 48 of a tilt locking and release dog 50 for minimized lash. This locking and release dog is pivotally mounted to the tilt cylinder 38 by laterally extending pivot pin 52 and can swing upwardly in a limited arc as determined by the clearances within the tilt cylinder. The head of the locking and release dog is formed with a curved camming slot 54 through which a laterally extending actuating lever 56 projects. As shown by FIGS. 2 and 4, the inboard end of the lever is pivoted to the tilt cylinder by an upwardly extending pivot pin 58 and projects from this pin through the curved camming slot 54 in the tilt locking and release dog. Lever 56 extends laterally outwardly from the tilt head assembly through an elongated exit slot 60 laterally formed in the tilt cylinder. An external knob 62 is provided on the free end of lever 56 for convenient manual gripping by the vehicle operator when a change in angular position of the tilt head assembly is desired. Lever 56 has a generally spherical camming member 64 formed thereon which slides in the curved camming slot 54 when the lever is swung on its pivot. A connector 66 is interposed in the lever 56 outboard of the tilt release dog and within the confines of the tilt cylinder. This connector has a cylindrical recess 67 for receiving one end of a helical compression return spring 68 for the lever 56. This spring extends longitudinally within the tilt cylinder 38 and is seated in a cylindrical spring pocket 69 formed therein. The spring 68 normally forces the lever forward so that camming member 64 is in the forward portion or locking part of the camming slot and in an over-center position with respect to the pivot axis A of the tilt head assembly to provide a positive lock and the positive holding of the tilt head assembly in any selected adjusted position.

By swinging the lever rearwardly and manually about the tilt release lever pivot pin 58, the camming member 64 will move rearwardly and in the slot to force the tilt release dog 50 to turn in an upward and clockwise direction to effect disengagement of the teeth of the dog and the rack 44. When this occurs, the tilt head assembly can be tilted to various angular positions illustrated in FIGS. 1 and 3.

To assist in this movement, there is a helical compression spring 71 which provides a spring force to urge the tilt head assembly to pivot on axis A in a counterclockwise and upward direction. This spring is seated in a bore in the tilt cylinder 38 and extends therefrom into engagement with an elongated spring guide 70 which is seated on a protuberance 72 of the support cylinder. A cylindrical plastic cover 74 disposed around the tilt cylinder provides a finely finished appearance for the tilt head assembly.

Assuming the tilt assembly is in one of its lower tilt positions and the lever 56 is manually turned rearwardly by the vehicle operator to effect release of the dog, the spring 71 will force the tilt head assembly to pivot upwardly until the manual lever is released to effect automatic multi-toothed engagement of the locking dog with the rack 44. This automatic engagement occurs since spring 68 forces the tilt release lever to its forward or locking position in the camming slot and in an over-center position with respect to the tilt axis. Under these conditions, any turning force directed to the steering wheel will not effect disengagement of the dog and undesired tilting of the tilt head assembly.

To move the tilt head assembly downward from any upper position, the tilt lever is manually pivoted toward the operator and held against the action of the lever return spring. The tilt head assembly is then manually moved or turned on the pivot axis A downwardly to a selected position at which point the lever is released so that the spring 68 can again effect the movement of the lever in the camming slot and the positive locking of the tilt head assembly.

While a preferred embodiment of this invention has been shown and described to illustrate the invention, other embodiments will become apparent to those skilled in the art. Accordingly, the scope of this invention is set forth in the following claims.

The embodiments of the invention in which an exclusive property or privilege is claimed are defined as follows:

1. A steering column for a vehicle comprising upper and lower steering shafts, universal joint means pivotally interconnecting said shaft so that said shafts can be turned as a unit for vehicle steering and so that said upper shaft can be tilted about a generally horizontal pivot axis to a plurality of angular positions with respect to said lower shaft, a steering wheel secured to the free end of said upper shaft for rotating said upper and lower shafts, tubular mast jacket means mounted in the vehicle and disposed around said lower shaft, a tilt head support secured to the upper end of said mast jacket means and projecting therefrom around said universal joint means, a tilt head assembly disposed around said upper shaft, pivot means pivotally mounting said tilt head assembly to said tilt head support for tilting movement with said upper shaft about said horizontal pivot axis, locking dog lever means having one end pivotally connected to the tilt head assembly and having a plurality of locking teeth at the free end thereof for releasably locking said tilt head assembly in any of a plurality of fixed angular positions with respect to said tilt head support, locking teeth means fixed to said tilt head support for selective locking engagement with the teeth of said locking dog lever, said locking dog lever having a cam slot therein, a manually operable actuator lever pivotally mounted in said tilt assembly and extending through said cam slot means and operative therein to effect movement of said locking dog means between locking and unlocking positions, and spring means mounted in said tilt head assembly engaging said actuator lever for moving said lever to an end position in said cam slot means in which said tilt head assembly is positively locked in adjusted position, said locking dog lever means being centrally mounted in said tilt head assembly and said locking teeth means comprising a rack of locking teeth fixed to said support to overlie said universal joint and said pivot axis.

2. A steering column for a vehicle comprising upper and lower steering shafts for rotation about a steering axis, universal joint means pivotally interconnecting said steering shafts so that said upper shaft can turn said lower shaft and be tilted about a generally horizontal pivot axis to a plurality of angular positions with respect to the lower shaft, a steering wheel secured to the free end of said upper shaft for rotating said upper and lower shafts, stationary mast jacket means disposed around said lower shaft, a tilt head support secured to the upper end of said mast jacket means and projecting axially therefrom, a tilt head assembly disposed around said upper shaft and rotatably supporting said upper steering shaft, pivot means pivotally mounting said tilt head assembly to said tilt head support for tilting movement about said pivot axis, elongated locking dog means being centrally mounted in said tilt head assembly and having locking teeth at one end thereof and further being pivotally connected at the other end for pivotal movement between locking and unlocking positions with respect to said tilt head support, said tilt head support having a series of locking teeth fixed thereto and overlying said universal joint means for locking engagement with the teeth of said locking dog means, actuator means for selectively pivoting said locking dog means to an unlocked position to allow said tilt head assembly and said upper steering shaft to be tilted as a unit to any one of a plurality of angular positions, said actuator means comprising a manually operable actuator lever pivotally mounted in said tilt head assembly, said locking dog means having cam slot means receiving and cooperating with said actuator lever means for moving said locking dog means between locking and unlocking positions, and spring means in said tilt head assembly contacting said actuator lever for urging said actuator lever and said locking dog means to said locking position in which said tilt head assembly is positively locked in adjusted position for high load resistance.

* * * * *